United States Patent
Nihashi et al.

[15] 3,636,448
[45] Jan. 18, 1972

[54] SIGNAL SOURCE DISCONNECTION-DETECTING METHOD FOR PLURAL SOURCES

[72] Inventors: Yoshiyuki Nihashi; Akira Osawa; Hiroshi Kuwahara, all of Hitachi, Japan

[73] Assignee: Hitachi, Ltd., Tokyo, Japan

[22] Filed: July 14, 1970

[21] Appl. No.: 54,811

[30] Foreign Application Priority Data

July 18, 1969 Japan..................................44/56465

[52] U.S. Cl..............................................324/140, 324/51
[51] Int. Cl............................................................G01r 31/02
[58] Field of Search.....................324/140, 51, 73; 340/256

[56] References Cited

UNITED STATES PATENTS 3,492,571  1/1970  Desler..................................324/51 X

*Primary Examiner*—Alfred E. Smith
*Attorney*—Craig, Antonelli, Stewart & Hill

[57] ABSTRACT

A disconnection-detecting method used with a system wherein analog voltages from a number of points are scanned so that the analog voltages are amplified by a preamplifier into a predetermined range of voltage levels and are then converted into corresponding digital form, said method characterized in that upon completion of an analog to digital conversion for each point of measurement, a disconnection-detecting voltage is applied to the input of the preamplifier for, on time-sharing basis, a predetermined time duration concurrent with the analog voltage to thereby detect a disconnection in the line.

6 Claims, 5 Drawing Figures

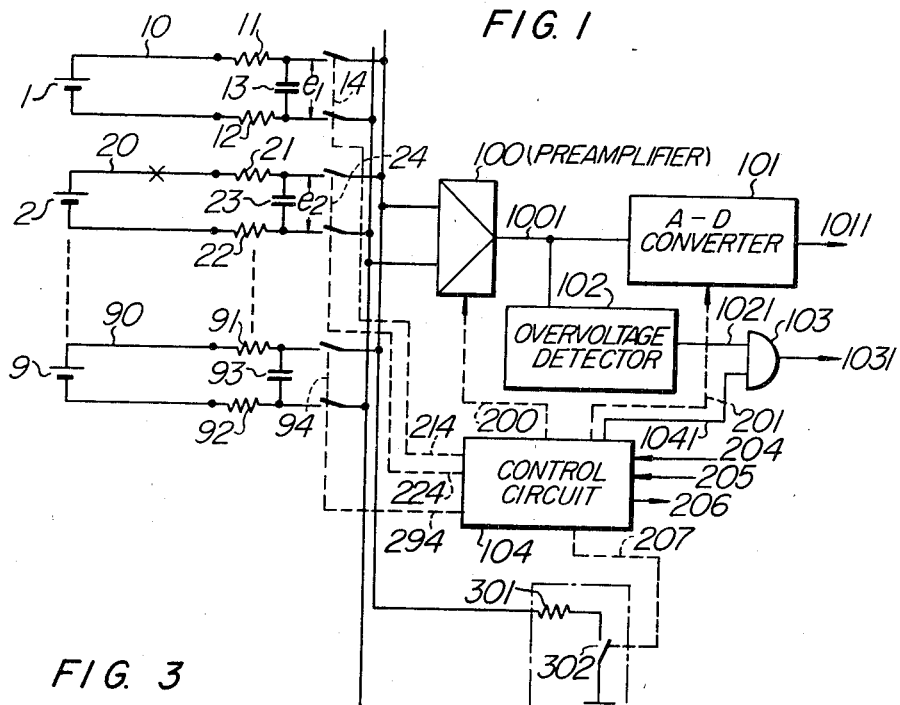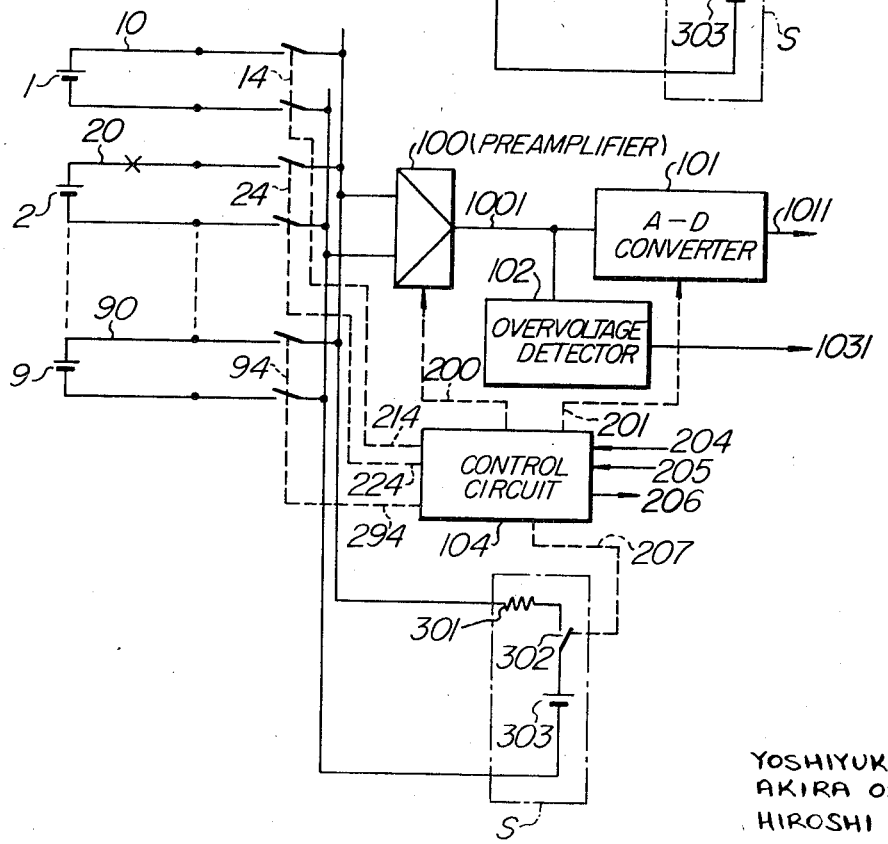

3,636,448

SIGNAL SOURCE DISCONNECTION-DETECTING METHOD FOR PLURAL SOURCES

BACKGROUND OF THE INVENTION

1. Field of the Invention

The present invention relates to a disconnection-detecting method and more particularly to a method of detecting the disconnection in analog input lines of a measuring system wherein a number of analog voltages points are scanned such that, after being amplified into a predetermined range of power level, these analog voltages are converted into digital form.

2. Description of the Prior Art

The conventional systems of detecting a disconnection in the line have been so constructed that a disconnection-detecting voltage is always applied through a high resistance to each channel (each of the individual analog input lines associated with their respective analog voltages to be measured is referred to as the channel), such that the occurrence of a disconnection in the channel is detected on the condition that the output of a preamplifier exceeds a predetermined range.

In other words, when there is no disconnection in the channel, the input to the preamplifier depends practically governed by the analog input voltage, whereas when there is a disconnection in the channel, the analog input voltage can no longer have any effect on input voltage to the preamplifier and the disconnection-detecting voltage increases and output of the preamplifier to a value larger than predetermined limit so that the disconnection in the channel is detected by an overvoltage detector connected to the output of the preamplifier.

These conventional methods of detecting the disconnection are disadvantageous in that as a high voltage for detecting the disconnection is applied at all times, the disconnection-detecting high voltage is applied to the input of the preamplifier through a high resistance in addition to the regular analog voltage so that this high voltage adds as much error with a corresponding decrease in the measurement accuracy.

To be more specific, the error $\Delta e$ of an indicated value caused by the disconnection-detecting voltage $E_o$ is given as $$\Delta e = (Rl/R_o) \times (E_o - E_i) \quad (1)$$

where
$R_o$ = a resistance coupled to the disconnection-detecting voltage
$Rl$ = a resistance in the analog input line
$E_i$ = an analog voltage to be measured.

As will be apparent from the equation (1), the error $\Delta e$ is proportional to $E_o - E_i$ and the value of $E_o$ is selected to be larger than the maximum value of the analog voltage to be measured, so that when the value of this analog voltage ranges from several millivolts to several 10s of volts and particularly when such an analog voltage $E_i$ as of the order of several millivolts is to be received, such an error exerts a considerable influence.

One method which has been proposed to reduce this influence is to increase the value of the resistor $R_o$, but this solution is not quite satisfactory as the excessively large value of the resistor $R_o$ requires a considerable time for the detection of a disconnection while the high-level analog voltages are being measured.

Another drawback of the conventional detecting systems is their complicate and expensive circuitry which results from the construction in which a disconnection-detecting voltage is applied to each channel through its respective high resistor.

This tendency is more apparent where a common mode voltage is present such as will be the case when the analog voltages to be measured are the interelectrode voltages of an electrolytic cell and thus it is impossible to use the same disconnection-detecting voltage in common with all the channels.

Since it has been generally practiced to take in analog voltages at some 1,000 points on a scanning basis, the provision of a higher resistor and a disconnection-detecting voltage separately coupled to each channel is also a fatal deficiency of the conventional systems.

SUMMARY OF THE INVENTION

One object of the present invention is to provide a disconnection-detecting method which prevents a reduced measurement accuracy in the measurement of analog voltages.

Another object of the present invention is to provide a disconnection-detecting method employing a simple and inexpensive circuitry.

Further object of the present invention is to provide a novel detecting method capable of ensuring the detection of a disconnection in the line independent of variations in the level of analog voltages.

According to one feature of the present invention, a disconnection-detecting voltage is established which is common to all the channels such that each time the analog to digital conversion is effected with respect to one measuring point, the disconnection-detecting voltage is applied to the input of a preamplifier to thereby detect a disconnection in the channel according to a variation in the output of the preamplifier.

According to another feature of the present invention, where a filtering capacitor is connected in the respective analog input lines, a disconnection in the line can be detected at least after one cycle upon application of the disconnection-detecting voltage.

According to a further feature of the present invention, where no filtering capacitor is connected in the respective analog input lines, a disconnection in the line can be detected immediately after the application of a disconnection-detecting voltage.

According to a still further feature of the present invention, a disconnection in the line can be detected reliably and in a short period of time independently of the level of analog voltages to be measured.

The above and other objects and features of the present invention will be apparent from the following descriptions of the preferred embodiments taken in conjunction with the accompanying drawings.

BRIEF DESCRIPTION OF THE DRAWING

FIG. 1 is a block diagram showing an embodiment of the device incorporating the method of the present invention.

FIG. 3 is a block diagram showing another embodiment of the present invention.

DESCRIPTION OF THE PREFERRED EMBODIMENTS

Figure 2:
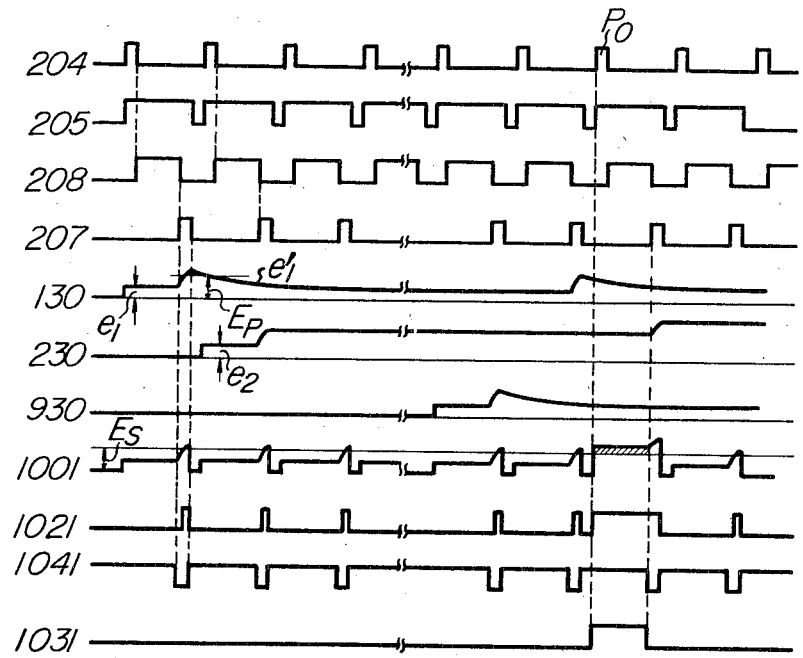
FIG. 2 is a time chart for explaining the operation of the device of FIG. 1.

FIG. 1 shows an embodiment of the disconnection-detecting method according to the present invention, wherein an analog voltage 1 at the point to be measured is introduced at the input of a preamplifier 100 via an analog input line 10, filtering resistors 11 and 12, a filtering capacitor 13 and through a channel-selecting switch 14.

Similarly, a measuring point analog voltage 2 is introduced at the input of the preamplifier 100 via an analog input line 20, filtering resistors 21 and 22, a filtering capacitor 23 and through a channel-selecting switch 24. A measuring point analog voltage 9 is also applied to the input of the preamplifier 100 via an analog input line 90, filtering resistors 91 and 92, a filtering capacitor 92 and through a channel-selecting switch 94. The channel-selecting switches 14, 24, .... 94 are selected in proper sequence by means of selection instructions 214, 224, .... 294 so that the measuring point analog voltages 1, 2, .... 9 are applied sequentially to the preamplifier 100. It is to be noted here that for purposes of description, only the analog voltages 1, 2, .... 9 are illustrated, although such analog voltages are measured at over 1,000 measuring points in ordinary cases.

The preamplifier 100 functions to adjust the different voltage levels of the measuring point analog voltages to a uniform output level that suits the analog to digital conversion and its gain is changed in accordance with the input level by means of a selection command 200 from a control circuit 104. An analog-digital converter 101 receives the analog output from the preamplifier 100 and produces a digital output 1011 proportional thereto.

Numeral 102 designates an overvoltage detector to detect that the output voltage of the preamplifier 100 is higher than a predetermined level and generally an overvoltage signal 1021 is generated when this output voltage reaches near 120 percent of the full scale of the preamplifier 100. Numeral 103 designates an AND circuit which provides a disconnection detection signal 1031 when and only when the overvoltage signal 1021 and a signal 1041 from the control circuit 104 which will be explained later are applied simultaneously.

Reference character S designates a disconnection-detecting voltage circuit comprising a resistor 301, a switch 302 adapted to be turned on by a command 207 from the control circuit 104 and a disconnection-detecting voltage 303. This disconnection-detecting voltage circuit S is provided common to all the channels and the disconnection-detecting voltage 303 is applied to the input of the preamplifier 100 through the resistor 301 when the switch 302 is turned on.

Referring now to FIG. 2, the disconnection-detecting operation will be explained. To begin with, a channel-designating signal 205 is applied to the control circuit 205 along with a start signal 204 for the initiation of measurement. Assuming that this selects the channel-selecting signal 214 and the switch 14 is turned on, an analog voltage $e_1$ stored across the filtering capacitor 13 is led through the switch 14 and the preamplifier 100 to the A–D converter 101 where it is converted into a digital quantity.

This A–D conversion takes place between the start signal 204 and the switch-on signal 207, that is, during the time interval designated by a signal 208. To be more specific, this A–D conversion is caused by a conversion instruction 201 which is provided by the control circuit 104 after a time by which the output of the preamplifier 100 should have achieved a steady state. Following the conversion of the analog voltage $e_1$ into a digital quantity, the control circuit 104 produces the switch 302 on signal 207 to turn the switch 302 on, so that the disconnection-detecting voltage 303 is applied through the switch 302, resistor 301 and channel-selecting switch 14 to the filtering capacitor 13 for a predetermined time $T_1$.

As shown at 130 in FIG. 2, the charging voltage applied to the capacitor 13 is selected such that after the predetermined charging time $T_1$, it becomes higher than an voltage $E_p$ when the output voltage of the preamplifier 100 exceeds an overvoltage detection level $E_S$ (in practice, larger than 120 percent of the preamplifier full scale) and this is independent of the magnitude of the voltage $e_1$. In this case, the outputs of the preamplifier 100 and the overvoltage detector 102 are as shown at 1001 and 1021 in FIG. 2, respectively.

When the output signal 1021 is on, the signal 1041 from the control circuit 104 is "0" and the output of the AND-circuit 103, i.e., the disconnection detection signal 1031 is off. The reason is that the signal 1041 is set to "0" while the disconnection-detecting voltage is being applied and it is set to "1" at all times excepting this period. Thus, with the disconnection-detecting voltage being applied, even when the output of the preamplifier 100 reaches the point where the overvoltage detector 102 produces its output signal 1021, this is not due to a disconnection in the line and hence no disconnection detection signal 1031 is produced by the AND-circuit 103.

Following the elapsing of the time $T_1$ for the application of the disconnection-detecting voltage 303, the channel-selecting switch 14 is turned to off so that, if there is no disconnection such as is the case with the analog input line 10 for the analog voltage 1, the voltage 130 charged across the capacitor 13 is discharged through the resistor 11, analog input line 10, analog voltage 1 and the resistor 12 as shown by $e_1'$ at 130 of FIG. 2.

If this discharge fails to be complete, it may give rise to an error upon the succeeding measurement. However, such an error may be made to be almost negligible, if the succeeding measurement is selected to about 10 times (filtering capacitor) × [(filtering resistance) + (signal source resistance)]. In other words, it is so designed that when there is no disconnection in the line, the voltage applied across the capacitor 13 is discharged so that the voltage at the succeeding measurement is the regular voltage $e_1$.

Now, as the channel-selecting signal 224 is selected so that the switch 24 is turned to on, in the same manner as previously explained the voltage $e_2$ across the capacitor 23 is applied to the A–D converter 101 through the switch 24 and the preamplifier 100 and it is converted into a desired digital form. Upon completion of this A–D conversion, the switch 302 on signal 207 from the control circuit 104 turns the switch 302 to on so that the disconnection-detecting voltage 303 is applied to the capacitor 23 through the switch 302, resistor 301 and switch 24. Variations in the voltage across the capacitor 23 is shown at 230 in FIG. 2.

Now assuming that there is a disconnection in the analog input line 20 at a point marked with a cross, there is no discharging circuit even after the switch 24 has been turned to off and thus the applied voltage 230 remains across the capacitor 23 as shown at 230 in FIG. 2, so that when the next measurement takes place (corresponding to a portion $P_o$ of the start signal 204), the AND-circuit 103 provides the disconnection detection signal 1031.

In other words, when there is a disconnection in the line, the voltage across the capacitor which has been increased higher than the overvoltage detection level is not discharged and it remains in this state, so that the disconnection detection signal 1031 is produced when the next measurement takes place, upon condition (signal 1041) that no disconnection-detecting voltage is being applied.

In the embodiment of the invention shown in FIG. 1, the analog input lines include a filtering capacitor. However, if an integrating A–D converter is employed for the A–D converter, the integrating A–D converter has its own noise-rejecting function and thus there is no need to connect a filtering capacitor in the analog input lines for such purpose.

FIG. 3 illustrates a different embodiment of the present invention wherein the analog input lines include no filtering capacitor.

In FIG. 3, like numerals designate the corresponding parts shown in FIG. 1. The operation of the device shown in FIG. 3 is essentially the same with that of the device in FIG. 1, excepting that the presence of a disconnection is detected upon the application of a disconnection-detecting signal because there is no filtering capacitor in the analog input lines.

In other words, if, for example, the analog input line 10 is in order when the channel-selecting switch 14 is selectively operated, the analog voltage 1 will be directly applied to the preamplifier 100, whereas when there is a disconnection in the analog input line 20 at the point made with a cross, as the channel-selecting switch 24 is selected and the disconnection-detecting voltage 303 is applied, the input to the preamplifier 100 is determined by the disconnection-detecting voltage 303 regardless of the analog voltage 2. In this case, the disconnection-detecting voltage 303 is selected to be of a value which is at the same time higher than the maximum value of the measuring point analog voltages and the overvoltage detection level of the overvoltage-detecting circuit 102. Thus, the disconnection detection signal 1031 is produced.

It is to be noted here that while in the embodiment of FIG. 1 the values of the disconnection-detecting voltage 303 and the resistor 301 are so chosen that the preamplifier output becomes higher than the overvoltage detection level in a predetermined time during which the disconnection-detecting voltage is being applied, regardless of the presence of a disconnection in the analog input line, in the embodiment of FIG. 3 the values of the resistor 301 and the disconnection-detecting voltage 303 are selected such that regardless of whether the measuring point analog voltage level is a very low voltage level or high voltage level, the preamplifier output remains lower than the overvoltage detection level when the analog input line is in order, while it always exceeds the overvoltage detection level when there is a disconnection in the line.

In practice, the following requirements (1) to (3) must be satisfied;

1. The value of the disconnection-detecting voltage 303 is selected to be higher than the analog voltage such that the overvoltage detector 102 comes into action when there is disconnection in the line and the gain of the preamplifier is the minimum. (That is, the measuring point analog voltage level is the maximum.)

2. The values of the disconnection-detecting voltage 303 and the disconnection-detecting resistor 301 are so chosen that when there is no disconnection in the line and the gain of the preamplifier is the maximum, the overvoltage detector 102 is rendered inoperative as shown by the following equation $$E_m + \frac{R_1 \cdot (E_0 + E_m)}{R_1 + R_0} \leq \frac{E_s}{G_h} \quad (2)$$

where
- $E_m$ m = the input full scale voltage with the maximum preamplifier gain
- $E_o$ = the disconnection-detecting voltage
- $R_l$ = the analog input line resistance
- $R_o$ = the disconnection-detecting resistor
- $E_s$ = the minimum value of the operating voltage of the overvoltage detector
- $G_h$ = the value of preamplifier gain with the maximum preamplifier gain 3. The following equation must be satisfied:

$$E_0 \left\{ 1 - e^{-\frac{T_1}{C_s \cdot T_0}} \right\} \geq \frac{E_s}{G} \quad (3)$$

where $C_s$ is the stray capacity between the analog input lines; $G$ is the preamplifier gain; and $T_1$ represents the time duration of the disconnection-detecting voltage application.

These three requirements can be readily met where the range of the measuring point voltage level is limited. However, assuming the case where the range of the ordinary input full scale is 10 mv. to 10 v., the preamplifier output voltage is 10 v., the time for the application of disconnection-detecting voltage is 5 ms., and the disconnection-detecting voltage is 15 v., from the equation (2) the disconnection-detecting resistor $R_o$ must satisfy the requirement $R_o > 15$ MΩ. Substituting this into the equation (3), the left member becomes 100 mv., with the result that the equation (3) cannot be satisfied when the preamplifier gain is less than 110. In other words, when the measuring point analog voltage level is high, the detection of a disconnection in the analog input line is impossible due to the stray capacity between the analog input lines.

However, it has been discovered out that these deficiencies can be overcome in the following manner.

In other words, these difficulties can be solved by setting the preamplifier gain to the minimum independent of the magnitude of the measuring point analog voltages only when the disconnection-detecting voltage is applied to the input of the preamplifier.

In this manner, if the preamplifier gain is set to unity with the previously mentioned assumption, the value of $R_o$ may be obtained from the equation (1) as 24 kΩ ≤ $R_o$ ≤ 38 KΩ and it is now evident that this value of $R_o$ can satisfy the requirements of the equation (3).

In the embodiment of FIG. 3, the preamplifier gain is set to the minimum only during the application time of the disconnection-detecting voltage as explained hereinbefore, when the range of the measuring point analog voltage level is wide.

Figure 4:
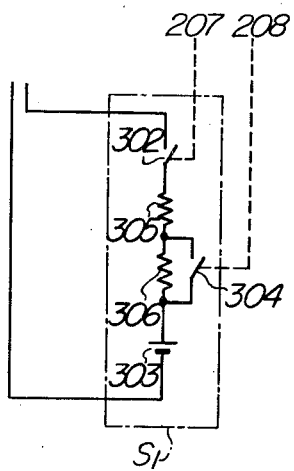
FIGS. 4 and 5 are schematic diagrams showing modifications of a part of the present invention.

FIG. 4 shows a modification of the disconnection-detecting circuit $S_1$ used with the present invention, which comprises switches 302 and 304 adapted to be turned to on by the switch-on signals 207 and 208 from the control circuit 104 (not shown), disconnection-detecting resistors 305 and 306, and a disconnection-detecting voltage 303.

While in the embodiment of FIG. 1 the disconnection-detecting voltage 303 is applied to the input of the preamplifier through the disconnection-detecting resistor 301 independently of the magnitude of the measuring point voltage level, the charging time constant is changed in accordance with the measuring point analog voltage level in the embodiment of FIG. 4.

In this figure, as in the case of FIG. 1, the switch 302 functions to charge the capacitor with the disconnection-detecting voltage 303, whereas the switch 304 is provided to apply the voltage so that the filtering capacitor has a sufficiently high voltage when the measuring point analog voltage level is high, and the switch 304 is turned to on to short circuit the resistor 306 thereby making the time constant shorter.

In practice, where the gains of the preamplifier 100 corresponding to the various levels of the measuring point analog voltage is high such as 500 times (analog voltage full scale 10 mv.), 166 times (analog voltage full scale 30 mv.) and 100 times (analog voltage full scale 50 mv.), the switch 304 is used in its off-state, whereas when the preamplifier gain is low such as 16 times (analog voltage full scale 300 mv.), five times (analog voltage full scale 1 v.), one time (analog voltage full scale 5 v.), and one-half times (analog voltage full scale 10 v.), the switch 304 is turned to on with the switch-on signal 208 from the control circuit 104 so that the resistor 306 is short circuited and the time constant is then the product of the resistor 305 and the capacitor C (by way of an example of the filtering capacitors in the respective channels), whereby the value of the resistor 306 is made smaller and a shorter time constant is provided to ensure that the disconnection is detected reliably and in a short period of time independent of the measuring point analog voltage level.

Figure 5:
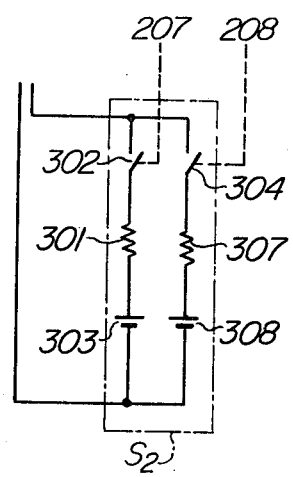

FIG. 5 illustrates another modification of the disconnection-detecting circuit $S_2$ used with the present invention, which comprises a switch 304 adapted to be turned to on with the switch-on signal 208 from the control circuit 104, a resistor 307 and a disconnection-detecting voltage 308 in addition to a switch 302, a resistor 301 and an overvoltage-detecting voltage 303.

In this case, the relative magnitudes between the resistors 301 and 307 as well as the voltages 303 and 308 are chosen to be 301>307, 303<308, respectively, and the switch 302 is turned to on for the measurement of the low level, and the switch 304 is turned to on for the measurement of the high level, respectively, by means of the control circuit 104.

Thus, even if the measuring point analog voltage level ranges extensively, a disconnection in the line can be positively detected in a short time by changing the disconnection-detecting voltages.

It is now evident from the foregoing descriptions of the preferred embodiments that according to the disconnection-detecting method of the present invention, the disconnection-detecting voltage is applied following every analog to digital conversions so that there is no decrease in the measuring accuracy of the analog voltages and at the same time the disconnection-detecting voltage is used in common with all the channels. Therefore, the circuitry used with the present invention is simple and inexpensive, and furthermore a disconnection in the line can be reliably detected in a short time for different analog voltage of varying levels, thereby achieving greater industrial effectiveness in these fields of applications.

Furthermore, it should be noted that the disconnection-detecting voltage in the above-described embodiment may be a current source. Thus, the term "disconnecting source" in claims includes a voltage and a current source.

I claim:

1. A disconnection-detecting method used with a system wherein analog voltages from a number of points are scanned so that the analog voltages are amplified by a preamplifier into a predetermined range of voltage levels and are then converted into corresponding digital form, said method characterized in that upon completion of an analog to digital conversion for each point of measurement, a disconnection-detecting voltage is applied to the input of the preamplifier for, on time sharing basis, a predetermined time duration concurrent with the analog voltage to thereby detect a disconnection in the line.

2. A disconnection-detecting method according to claim 1 characterized in that the analog voltage is applied to the preamplifier through a filtering capacitor such that a disconnection in the line is detected on the condition that the output of said preamplifier exceeds a predetermined range when the disconnection-detecting voltage is not applied to said preamplifier.

3. A disconnection-detecting method according to claim 1 characterized in that the analog voltage is directly applied to the preamplifier without the intermediary of a filtering capacitor such that a disconnection in the line is detected on the condition that the output of said preamplifier exceeds a predetermined range when the disconnection-detecting voltage is applied to said preamplifier.

4. A disconnection-detecting method according to claim 3 characterized in that the value of the preamplifier gain is set to a value corresponding to the maximum level of the analog input voltages only when the disconnection-detecting voltage is applied.

5. A disconnection-detecting method according to claim 1 characterized in that the disconnection-detecting voltage is applied by changing the resistance value in accordance with the level of the analog voltage.

6. A disconnection-detecting method according to claim 1 characterized in that a disconnection-detecting voltage corresponding to the level of the analog voltage is selected and applied to the input of the preamplifier.

* * * * *